United States Patent [19]

Eggers et al.

[11] Patent Number: 4,974,880
[45] Date of Patent: Dec. 4, 1990

[54] REDUCTION BUSHINGS IN THE CASING OF PRODUCTION AND INJECTION WELLS

[75] Inventors: Flávio F. Eggers, Salvador; Carlos A. D. S. Jesus, Catu; Ernesto T. Foronda; Álvaro A. H. Rocha, both of Salvador, all of Brazil

[73] Assignee: Petroleo Brasileiro S.A. - Petrobras, Rio de Janeiro, Brazil

[21] Appl. No.: 330,030

[22] Filed: Mar. 29, 1989

[30] Foreign Application Priority Data

Mar. 29, 1988 [BR] Brazil .................................. PI8801440

[51] Int. Cl.$^5$ ............................................. F16L 25/00
[52] U.S. Cl. ..................................... 285/177; 285/138; 285/140; 285/286; 285/906
[58] Field of Search ............. 285/177, 286, 140, 14 L, 285/143, 138, 906

[56] References Cited

U.S. PATENT DOCUMENTS

| | | | |
|---|---|---|---|
| 2,134,199 | 10/1938 | Newton et al. | 285/177 X |
| 2,446,481 | 8/1948 | Letterman | 285/177 |
| 2,748,869 | 6/1956 | Hager | 285/286 X |
| 4,343,497 | 8/1982 | Bot | 285/286 X |

FOREIGN PATENT DOCUMENTS 271464  1/1951  Switzerland ........................ 285/140

*Primary Examiner*—Dave W. Arola
*Attorney, Agent, or Firm*—Sughrue, Mion, Zinn, Macpeak & Seas

[57] ABSTRACT

Improvement to reduction bushings (10, 30, 30), along with particulars of the use thereof, and to systems for sealing to the casing (15, 42), that are considerably different from those so far in use. Instead of O-rings, the seal between the bushing (10, 20, 30) and the casing (15, 42) is achieved by arc-welding (16) done at the tips thereof or by threading the bushing into the top of the casing.

3 Claims, 4 Drawing Sheets

FIG.10
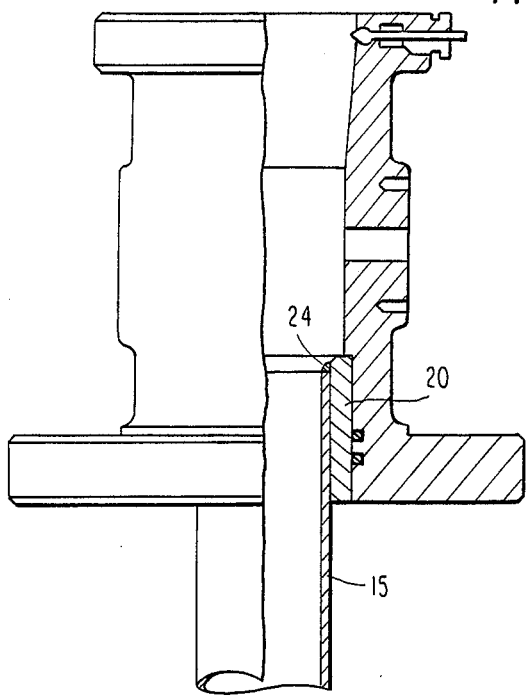
FIG.11
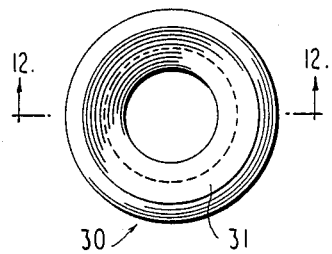
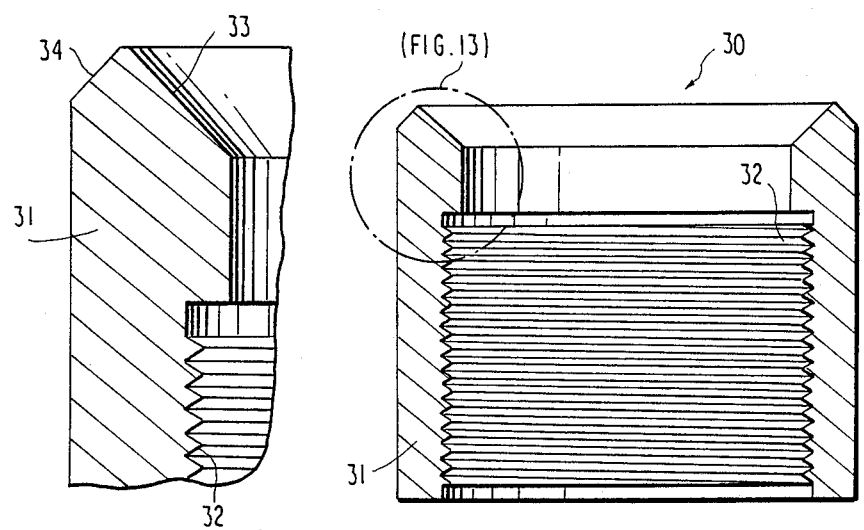
FIG.13   FIG.12

REDUCTION BUSHINGS IN THE CASING OF PRODUCTION AND INJECTION WELLS

FIELD OF THE INVENTION

This invention concerns improvements made to the reduction bushing for the casing of production and injection wells in order to provide a better seal between such casing and the production head.

BACKGROUND OF THE INVENTION

Gas, oil and water wells usually contain one or more well casing pipes which stretch from the surface downwards to the soil. Such pipes lie one within the other and are meant for several purposes, such as keeping the well-hole entire and governing the flow and the pressure of fluid within the well. For the purposes of this application, piping is referred to as casing if there is at least one pipe within such casing and such pipe is referred to as a pipe.

At the well-head various different kinds of well-head members are connected and sealed to the casing and the piping, and they serve several uses, among which that of supporting the casing and the piping as from the surface and that of acting as a means of linking fluid conduits to the casing as well as to the circular space created by the piping and the several casing pipes around it and that of governing the pressures of the fluid brought about in the well-head. In order to govern fluid pressures, which are often very high, seals have to be provided between the several members of the well-head and the piping and the casing. Elastomeric seals have been used for such devices which provide a seal against the piping or casing when pressure is exerted on the seal against such piping or casing. This takes place in various devices, pressure being exerted vertically on the seal, obliging it to expand internally against the piping or casing and thereby seal the latter externally. The elastomeric seal can be pushed from the inside too, by the pressure exerted upon the surface of its circumference outside. For instance, such seals have been used for many years, whereby the fluid exerts pressure in the space around the outside diameter of the elastomeric seal and thereby pushes the latter internally. The space around the seal—the annular space—is connected to the outside of the device by means of a control valve through which the fluid under pressure is introduced. In some sealing processes a liquid plastic, under pressure, is injected through the control valve to provide the seal, the plastic thereupon hardens, so that a permanent seal is provided.

Many well operators think that elastomeric seals are not to be trusted at extreme temperatures which may cause them to break down unwantedly.

The art also encompasses metallic seals as covered by U.S. Pat. No. 4353560 of Oct. 12, 1982 which refers to a metallic ring assembly to seal an annular space between the metal surfaces of concentric tubular members. The assembly consists of a central metallic sealing ring with tapering upper and lower annular flanges at both inside and outside peripheries. The sealing ring lies between adapter rings that are concentric with the sealing ring and that have bevelled annular edges that are in contact with the tapering surfaces of the sealing ring flanges, at an angle of five degrees. When pressed axially the annular flanges of the metallic sealing ring are deflected radially and their ends are bent and pushed against the surfaces of the members, thereby providing the annular space for metal to metal seals with the latter. Flanges are cut off at their loose ends which means that the initial hooking up of the adapter rings to the metallic sealing ring and the annular space around the members is by means of the annular edges at the ends of the flanges and the pressing force is concentrated at such edges. Axial loading is applied by means of screws the ends of which are worked upon by cams and there is a cam surface working upon the upper adapter ring.

In one of the aspects of this invention improvements are provided for reduction bushings for production and injection well casings.

To complete oil-producing or injectors wells on land use is made of a casing head coupled to a flanged production head, usually of the single or double completed type, upon which the Xmas tree is assembled.

The size of the upper flange of these production heads is usually 7 1/6 inch (18.2 cm) and of the lower one, 11 inches (27.94 cm) (API specification), while the inside diameter of its bottom part is 7 1/6 inches (18.2 cm), in which there are O-rings to enable sealing to take place against the top of the production casing, which is 7 inches (17.78 cm) in outside diameter, which fits into it over a distance of about 4 inches (10.16cm).

When a well is lined with 5½ inch inside diameter pipes (13.97cm), a reduction bushing has to be employed in order to bring about the sealing between such lining and the production head. Such sealing of bushings has up to now been done by means of O-rings.

SUMMARY OF THE INVENTION

This invention is meant to bring fresh improvements to reduction bushings, through certain features in the use thereof, and casing sealing methods considerably different to those so far used. In this invention, instead of O-rings the sealing between the bushing and the casing is achieved by arc welding the top or threaded end of the bushing to the top of the casing.

One of the features of this invention is that the reduction bushing consists of a metal cylinder machined on its outside so as not to affect any outside sealing next to the O-rings lying inside the production head. In order to make it easier to make a weld and ensure coaxial placement in relation to the 5½ inch (13.97cm) production casing, plate steel guide rings are made and welded to the ends of the cylinder. At the top and bottom inside ends of the cylinder stops are provided to take the guide rings. Rings are arc-welded to the cylinder. The top end of the cylinder is bevelled in order to make it easier for it to fit into the production head, and also to prevent any damage being done to gaskets thereat.

Another of the features of this invention is that there is a bushing, as before, but of simpler design, since it does not need any guide rings, its coaxial positioning with the casing for welding purposes, being achieved through the use of a machined cylinder. Such bushing also has a bevel at its upper outside end in order to make it easier for it to fit into the bottom of the production head without damaging any gaskets. The upper inside bevel is meant to make it easier to apply the weld that will seal the bushing to the casing.

A third feature of this invention is that the bushing provided is higher than the ones referred to previously, since in its top part there is a drill guide, its outstanding point being the fact that sealing to the casing is achieved by screwing. This type of bushing is best when a threaded 5½ inch (13.97 cm) 8 thread or buttress pin is put in next to the upper flange of the casing head, since in addition to there being no need to do any welding there is the fact that this kind of bushing includes a guide and a drill which therefore means that the latter does not have to be sought.

BRIEF DESCRIPTION OF THE DRAWINGS

These and other aims of this invention will be understood from the description that follows of the preferred uses along with the drawings attached hereto, where.

FIG. 10 is a partial vertical sectional view showing the seal between the casing and the production head achieved with the aid of a reduction bushing according to the second embodiment of this invention;

FIG. 11 is a top plan view of the reduction bushing according to a third embodiment of this invention;

FIG. 12 is an enlarged cross-sectional view of the reduction bushing along line AA' of FIG. 11;

FIG. 13 is an enlarged detail taken from FIG. 12;

DESCRIPTION OF THE PREFERRED EMBODIMENTS

Figure 2:
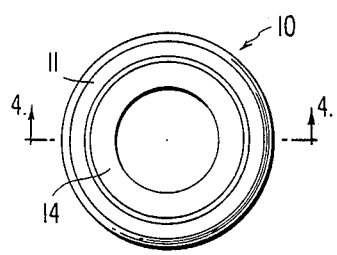
FIG. 2 is a top view of the reduction bushing as per the first aspect of this invention.
Figure 1:
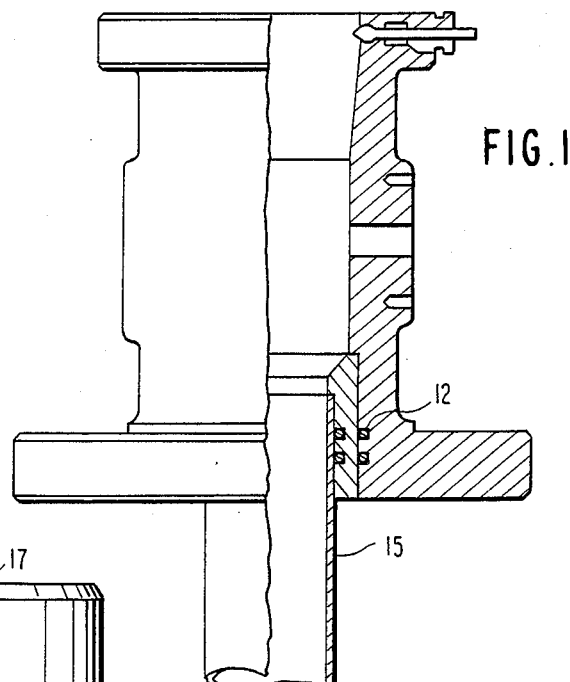
FIG. 1 is a view in part vertical section showing the seal between the casing and the production head achieved with the aid of a reduction bushing and O-rings.
Figure 3:
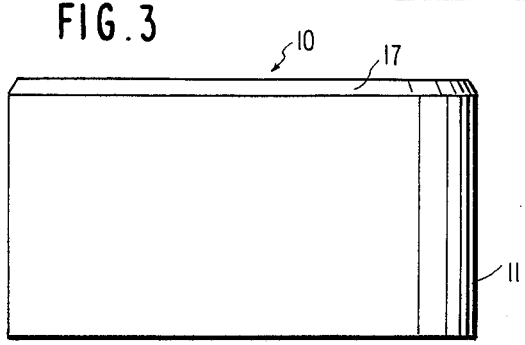
FIG. 3 is an enlarged side view of the reduction bushing.
Figure 4:
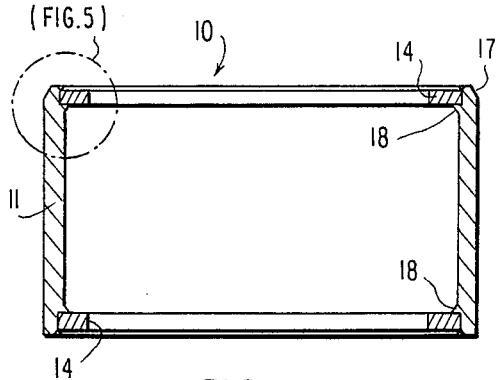
FIG. 4 is an enlarged cross section of the reduction bushing along line AA' of FIG. 2.
Figure 5:
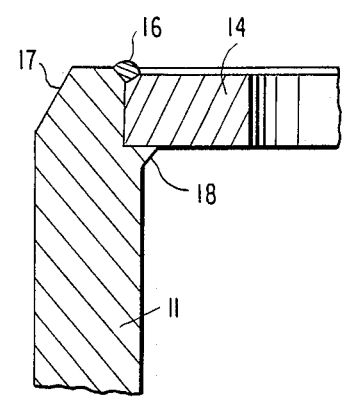
FIG. 5 is a detail taken from FIG. 4 and amplified.
Figure 6:
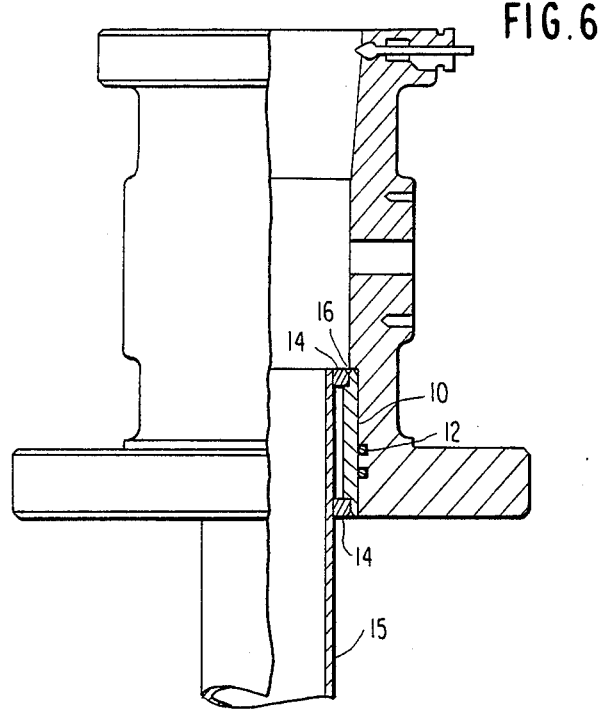
FIG. 6 is a partial vertical sectional view showing the seal between the casing and the production head achieved with the aid of a reduction bushing according to the first embodiment of this invention.

As is to seen from the Figures that make up this explanation, a reduction bushing (10) of the first aspect of this invention, as shown in FIGS. 2 to 6, is made up of a metal cylinder (11) machined on the outside so as not to hinder its outside seal to the O-rings (12) figure inside the production head, and of guiding rings (14) made of plate steel which make it easier to apply the weld, and ensure coaxial placement in relation to the 5½ inch production casing (15), which are made and welded to the ends of the cylinder, and of stops (18) provided at the upper and lower inside ends of the cylinder (11) to take the guide rings (14), said guide rings (14) being welded (16) to the cylinder, and of an outside upper bevel (17) to the cylinder, meant to make it easier to fit it into the production head.

Figure 7:
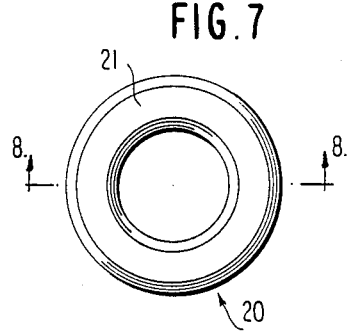
FIG. 7 is a top plan view of the reduction bushing according to the second embodiment of this invention.
Figure 9:
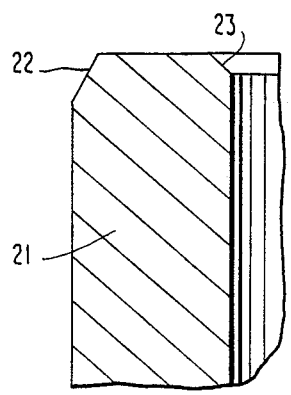
FIG. 9 is an enlarged detail taken from FIG. 8.
Figure 8:
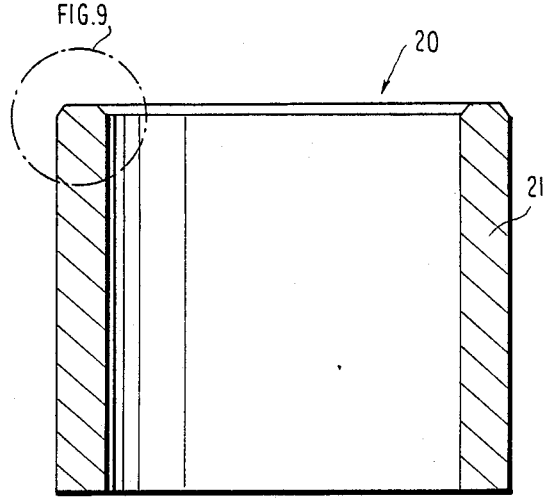
FIG. 8 is an enlarged, cross-sectional view of the reduction bushing along line AA' of FIG. 7.

According to the second aspect of this invention, the reduction bushing (20) shown in FIGS. 7 through 10 inclusive, is provided with a machined cylinder (21) in order to line up the reduction bushing (20) coaxially with the casing (15), for welding purposes, and is provided with a bevel (22) at the top outside end of the bushing (20), in order to make it easier to fit it into the the bottom of the production head, without damaging gaskets, and an upper inside bevel (23) meant to make it easier to apply the weld which will seal the bushing (20) to the casing (15).

Figure 14:
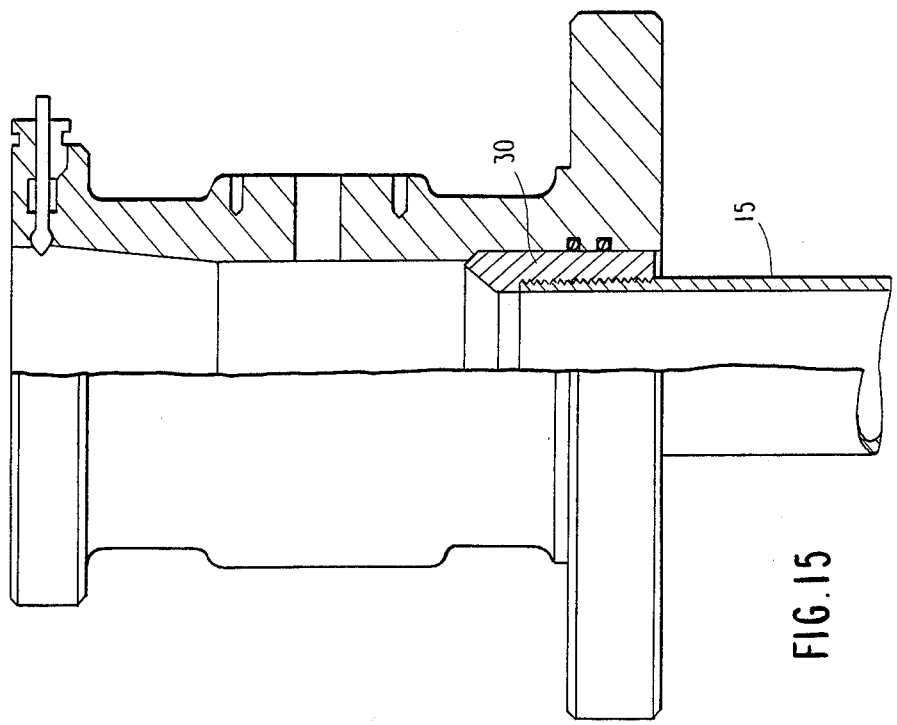
FIG. 14 is a partial vertical sectional view of a connection consisting of an A thread of buttress pin next to the upper flange of the casing head.
Figure 15:
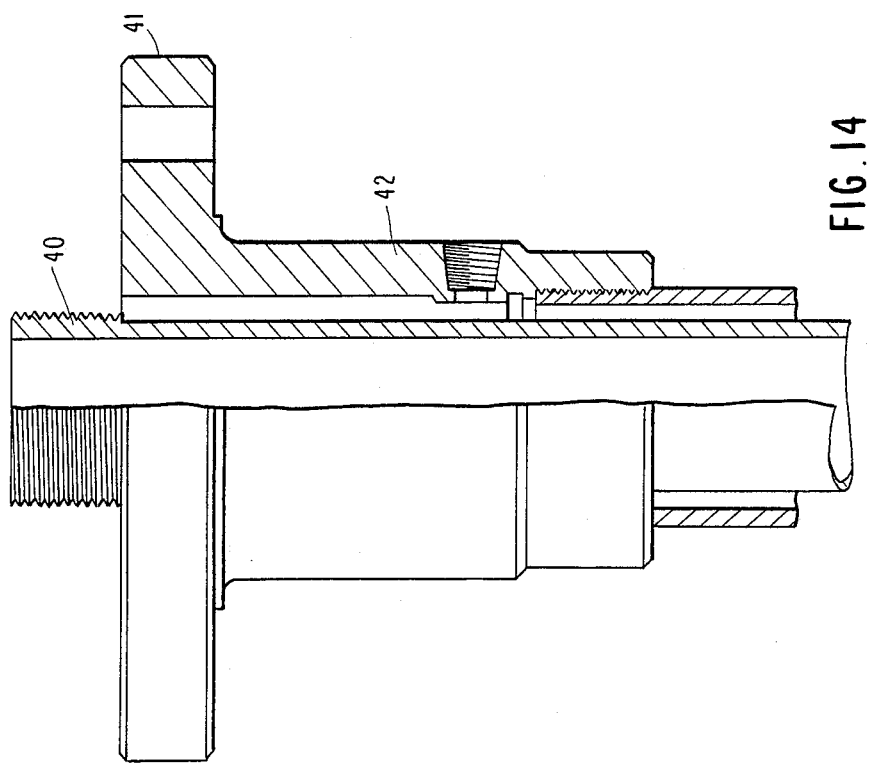
FIG. 15 is a partial vertical sectional view showing the seal between the casing and the production head achieved with the aid of a reduction bushing according to the third embodiment of this invention.

According to the third aspect of this invention, the reduction bushing (30), shown in FIGS. 11 to 15, is provided with a cylinder (31) made of carbon steel threaded inside with 8 buttress threads(32), a drill guiding bevel (33) at the top end of the bushing (30) and a bevel (34) to fit into the production head, seal to the casing (42) being a threaded seal, said bushing (30) being best when there is an 8 thread or buttress (40) pin next to the upper flange(41) of the casing head (42).

Though this invention has been described in terms of its preferred arrangements, those who are experts in the art will perceive that many other variations or modifications are possible. Thus it is preferred that this invention be bound not by the specific description thereof provided herein but solely by the claims attached hereto.

We claim:

1. A sealed connection between a well casing and a well production head comprising: an annular production head having an axial bore, at least one O-ring seal within said bore, a hollow cylindrical reduction bushing having an outside diameter sized to said bore and positioned within said bore, a tubular well casing pipe having an end coaxially positioned within said reduction bushing, said reduction bushing comprising a metal cylinder machined on the outer periphery thereof, sized to the diameter of said production head bore so as not to hinder the outside seal thereof with said at least one O-ring seal and insertably received within said production head bore, stops formed at respective upper and lower radially inside ends of said cylinder, annular guide rings positioned within said stops of said cylinder and arc welded to said cylinder at said stops and said tubular well casing having said end positioned within said annular stops and being welded thereto and said machined metal cylinder including a radially outside bevel 17 at the upper end thereof for facilitating the fit of said machined cylinder into said production head.

2. A sealed connection between a well casing and a well production head comprising: an annular production head having an axial bore, at least one O-ring seal within said bore, a hollow cylindrical reduction bushing having an outside diameter sized to said bore and positioned within said bore, a tubular well casing pipe having an end coaxially positioned within said reduction bushing, said reduction bushing comprising a metal cylinder machined on the outer periphery thereof, sized to the diameter of said production head bore and positioned therein so as not to hinder the outside seal thereof with said at least one O-ring seal, and being provided with a first bevel at a top radially outside end of said bushing for facilitating the fit of said bushing into the bore of the production head without damaging said at least one O-ring seal, and a top, radially inside bevel and a tubular well casing pipe having an upper end coaxially positioned within said reduction bushing and a weld applied to the upper end of said tubular well casing pipe and said bushing at said top, radially inside bevel, thereby sealably coupling the bushing to the upper end of said well casing pipe.

3. A sealed connection between a production head and well casing comprising: an annular production head having a bore, having an upper flange, said production head having a thread above said upper flange, at least one O-ring sealed within said bore, a hollow cylindrical reduction bushing coaxially positioned within said bore, a tubular well casing pipe having an end coaxially positioned within said reduction bushing, said reduction bushing comprising: a metal cylinder machined on the outer periphery thereof, sized to the diameter of the production head bore and positioned therein so as not to hinder the outside seal thereof with said at least one O-ring seal, and wherein said reduction bushing further comprises said reduction bushing metal cylinder threaded internally, and wherein said tubular well casing pipe has external threads on an upper end thereof sealingly threaded to said internally threaded reduction bushing, and wherein said reduction bushing comprises a radially outside bevel provided on the upper end of said bushing for facilitating passage through said production head bore.

* * * * *